United States Patent [19]

Findlan et al.

[11] Patent Number: 5,436,428
[45] Date of Patent: Jul. 25, 1995

[54] METHOD OF MANUFACTURING WELDING ELECTRODE FOR UNDERWATER WELDING

[75] Inventors: Shane J. Findlan, Harrisburg; Michael K. Phillips, Matthews, both of N.C.; Gordon H. Macshane, Fullerton, Calif.; Artie G. Peterson, Jr., Locust, N.C.

[73] Assignee: Electric Power Research Institute, Inc., Palo Alto, Calif.

[21] Appl. No.: 103,606

[22] Filed: Aug. 6, 1993

Related U.S. Application Data

[63] Continuation-in-part of Ser. No. 730,246, Jul. 15, 1991, abandoned.

[51] Int. Cl.6 .............................................. B23K 35/00
[52] U.S. Cl. .................................. 219/145.23; 219/72
[58] Field of Search ..................... 219/145.23, 145.41, 219/72, 137 WM

[56] References Cited

U.S. PATENT DOCUMENTS

| | | | |
|---|---|---|---|
| 2,410,461 | 11/1946 | Ronay | 219/145.23 |
| 2,552,176 | 5/1951 | Hummitzsch | 219/145.41 |
| 3,835,288 | 9/1974 | Henderson | 219/145.41 |
| 4,010,347 | 3/1977 | Cole | 219/146 |
| 4,220,487 | 9/1980 | Anderson | 219/145.23 |
| 4,804,818 | 2/1989 | Anderson | 219/145.23 |

FOREIGN PATENT DOCUMENTS 559033  2/1944  United Kingdom ........... 219/145.41

*Primary Examiner*—Clifford C. Shaw
*Attorney, Agent, or Firm*—Fish & Richardson

[57] ABSTRACT

A welding electrode suitable for underwater welding is manufactured from a welding rod with a flux layer thereon by forming a protective coating of a waterproofing material at least over this layer and subjecting it to a pressure at least as great as the pressure at a depth of water at which the welding electrode is intended to be used such that the waterproofing material is driven into pores and interstices of the flux to impregnate it. Waterproofing materials which do not produce organic residues at welding are preferred, such as liquid sealant with metallic aluminum powder, polyurethane, resins and epoxy-based coatings.

7 Claims, No Drawings

METHOD OF MANUFACTURING WELDING ELECTRODE FOR UNDERWATER WELDING

BACKGROUND OF THE INVENTION

This is a continuation-in-part of application Ser. No. 07/730,246 filed Jul. 15, 1991, now abandoned.

This invention relates to welding electrodes for underwater welding and methods of manufacturing such electrodes. More particularly, the invention relates to such welding electrodes which are properly waterproofed for use in a high-pressure underwater environment.

A common type of welding is by electric arc using a so-called stick electrode, which commonly consists of a length of welding rod covered by a flux layer. An arc is struck between the electrode and a base metal which produces heat. A protective gas and a slag layer are generated around the welding zone, protecting the molten weld metal from oxidation such that a sound joint can be formed. This process is sometimes referred to as shielded metal arc welding (SMAW). There has long been a need for underwater welding in a variety of construction and repair jobs. Some underwater welding may be advantageously used, for example, in the repair of nuclear reactor components.

When a SMAW process is used for underwater applications, a number of problems appear in the weld zone, such as lack of fusion, cracking and porosity. It appears that these problems result from difficulties in keeping the molten weld puddle shielded under water by the generated gas and slag layer. It is believed that this further results from water absorption of the flux layer on the weld rod, causing the flux layer to crack and to spall and permitting moisture to intrude into the flux and into the welding zone.

Prior art welding electrodes have been coated for waterproofing with materials such as waterproof paint, shellac or a paraffin wax. Such coatings, however, have been found to cause problems such as contamination of the surrounding water by burnt wax, poor weldability, and poor visibility. Moreover, some of the prior art coatings are ineffective. As welding is carried out at greater depths, the hydrostatic pressure of the environment increases and so does the tendency of water to permeate the flux layer and the surrounding coating.

SUMMARY OF THE INVENTION

It is therefore an object of this invention to provide a method of manufacturing an improved welding electrode suited for underwater welding with which the aforementioned problems can be eliminated.

A welding electrode embodying the invention, with which the above and other objects can be accomplished, may be characterized as being covered by a waterproofing protective coating which is applied under a highly pressurized condition such that the coating material such as a liquid sealant is forced into the pores and discontinuities of the electrode coating and a water-tight seal can be provided. The coating material is selected such that organic residues will not be produced as the electrode is consumed in a welding operation.

DETAILED DESCRIPTION OF THE INVENTION

A welding electrode according to the present invention may be manufactured by providing a base electrode substantially consisting of a welding rod and a flux coating applied thereon, and placing it inside a container filled with waterproofing liquid sealant so as to fully submerge therein at least the portion of the welding rod covered with the flux coating. The sealant, for example, may comprise metallic aluminum in a vehicle such as an aluminum paint. The container is then placed inside a pressure vessel, such as an autoclave, which is closed, sealed and pressurized, say, with an inert gas. This forces the waterproofing sealant into the pores, interstices and discontinuities of the flux coating, thereby providing a water-tight seal even in the underwater condition in which the electrode may be used.

For this reason, the pressure to be applied inside this pressure vessel should be at least as great as the hydrostatic pressure which will exist at the depth where the welding electrode is expected to be used. Thus, a pressure of 100 pounds and 600 pounds will be required if the expected depth in water is 230 feet and 1380 feet, respectively. Experimental tests showed that electrodes thus pressure-treated were sealed well enough to permit the welder to extinguish the arc and restart without difficulty. This would not have been done easily with prior art electrodes since the wax or plastic seal would burn back some distance from the arc, exposing the electrode flux coating to water. Upon extinguishing the arc, water can then enter the coating around through the exposed surface. By impregnating the flux coating with waterproofing sealant, the flux coating is more effectively protected, and the sealant, if its material is well selected, does not burn off as readily.

Preferably, however, the pressure which is applied is at least twice as great as the pressure of the water in which the electrode is expected to be used. This makes the waterproofing material certainly to be driven into pores and interstices of the flux coating, insuring that no voids will be left in or beneath the coating which may result in discontinuities in the coating or collapse of the coating under water pressure resulting in intrusion of water into the flux.

The description given above is not intended to limit the scope of the invention. Many modifications and variations are possible on what has been disclosed above within the scope of this invention. For example, a continuous thin metallic aluminum layer may be formed on a shielded metal arc-coated electrode by a thermal metal-spray coating method, although tests have shown that the electrodes waterproofed by using a liquid sealer performed significantly better than those with a thin metallic aluminum layer applied by thermal spray coating.

It has been found that aluminum is an especially advantageous material because aluminum powder acts as a deoxidizer during welding. Moreover, as the electrode is consumed, aluminum does not leave behind or disperse in the water any organic residue. For this reason, the binder used in the aluminum paint should be such that no large quantity of residue be created during welding. Other suitable metals may be employed in place of aluminum. Examples of non-metallic materials which are equally effective as waterproofing sealant include polyurethane, resins and epoxy based coatings because they create very little residue when melted or burnt by the heat of welding.

What is claimed is:

1. A method of manufacturing a welding electrode suitable for underwater welding, said method comprising the steps of:

providing a base electrode substantially consisting of a welding rod and a layer of flux on said welding rod;

forming a protective coating of a waterproofing material at least over said layer of flux;

subjecting said base electrode with said protective coating thereon to a pressure which is at least as great as the pressure at a depth of water at which said welding electrode is intended to be used, wherein said waterproofing material is caused to impregnate said flux.

2. The method of claim 1 wherein said pressure is at least twice as great as the pressure at said depth of water at which said welding electrode is intended to be used.

3. The method of claim 1 wherein said waterproofing material is selected from a group of materials that do not create organic residues when melted or burnt at welding by said welding electrode.

4. The method of claim 1 wherein said waterproofing material includes an aluminum paint comprising aluminum powder.

5. The method of claim 1 wherein said step of forming a protective coating comprises the steps of placing said base electrode in a container filled with said waterproofing material and submerging at least a portion of said electrode rod with said layer of flux thereon in said waterproofing material.

6. The method of claim 5 wherein said step of subjecting said base electrode with said protective coating thereon to said pressure comprises the step of placing said container inside a pressure vessel which is closed, sealed and pressurized.

7. The method of claim 1 wherein said step of forming said protective coating is carried out by a thermal metal-spray coating method.

* * * * *